US012421090B2

(12) United States Patent
Foroni et al.

(10) Patent No.: US 12,421,090 B2
(45) Date of Patent: Sep. 23, 2025

(54) CLAMPING EQUIPMENT FOR LIFTING LOADS AND FORKLIFT TRUCK COMPRISING SUCH EQUIPMENT

(71) Applicant: BOLZONI S.P.A., Podenzano (IT)

(72) Inventors: Pietro Foroni, Casalpusterlengo (IT); Nicola Bovo, Ponte dell'Olio (IT)

(73) Assignee: BOLZONI S.P.A., Podenzano (IT)

( * ) Notice: Subject to any disclaimer, the term of this patent is extended or adjusted under 35 U.S.C. 154(b) by 233 days.

(21) Appl. No.: 18/168,694

(22) Filed: Feb. 14, 2023

(65) Prior Publication Data

US 2023/0264935 A1 Aug. 24, 2023

(30) Foreign Application Priority Data

Feb. 22, 2022 (IT) ........................ 102022000003308

(51) Int. Cl.
*B66F 9/18* (2006.01)

(52) U.S. Cl.
CPC ...................................... *B66F 9/18* (2013.01)

(58) Field of Classification Search
CPC ....................................................... B66F 9/183
See application file for complete search history.

(56) References Cited

U.S. PATENT DOCUMENTS 2,959,445 A * 11/1960 Breslav ................... B66C 1/485 414/626
3,199,910 A * 8/1965 Bradley .................. B66C 1/485 280/460.1
3,971,584 A * 7/1976 Duncan ................... B66F 9/183 294/902
3,971,585 A * 7/1976 LaBudde ................ B66F 9/183 294/902

FOREIGN PATENT DOCUMENTS

JP 50-149052 A 11/1975
JP 7-9899 U 2/1995
JP 2012-240817 A 12/2012

OTHER PUBLICATIONS

Italian Search Report & Written Opinion Issued Oct. 3, 2022 in Italian Application 102022000003308 filed on Feb. 22, 2022 (with English Translation of Categories of Cited Documents), 9 pages.

* cited by examiner

*Primary Examiner* — Mark C Hageman
(74) *Attorney, Agent, or Firm* — Workman Nydegger

(57) ABSTRACT

A clamping equipment for lifting a load arranged to be coupled to a forklift truck includes a fixed frame which extends in a longitudinal direction and apt to be coupled to a carrier plate of a forklift truck; two jaws opposite each other and slidingly connected to the fixed frame along the longitudinal direction in order to be tightened in grip on a load; where each jaw includes a support connected to the fixed frame and configured to be moved in an integral manner with the fixed frame in a vertical direction and in a sliding manner relative to the fixed frame in the longitudinal direction; a panel coupled to the support and which has a surface configured to come into contact with a load to be handled; and a coupling assembly associated with the support and the panel and configured to movably couple the panel to the support with a motion component in a direction orthogonal to the panel and a motion component in vertical direction.

12 Claims, 9 Drawing Sheets

Fig. 4
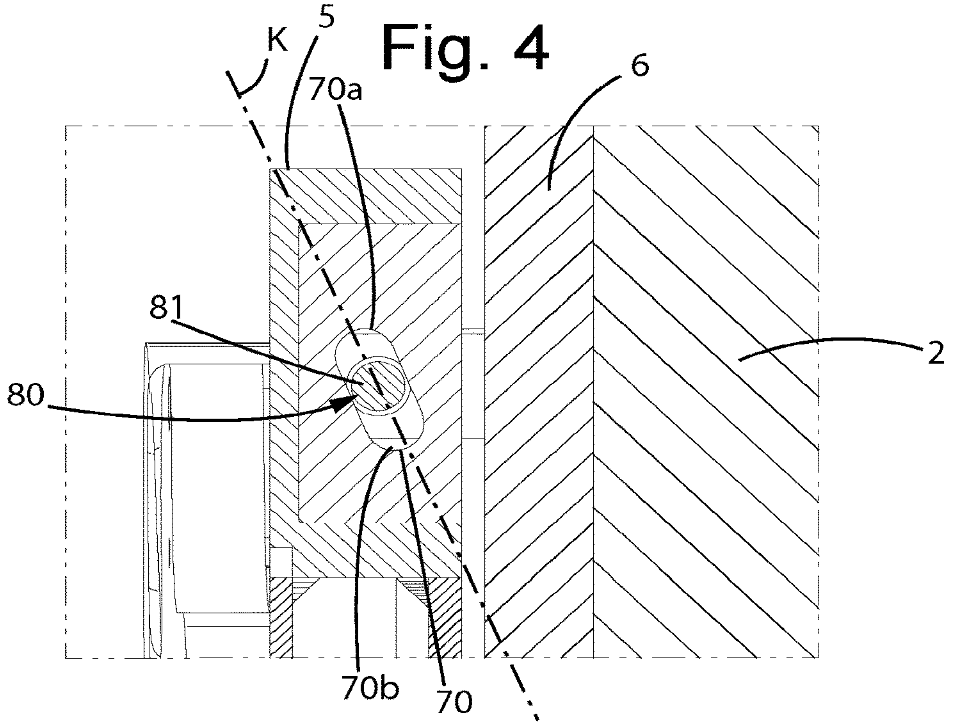
Fig. 5a
Fig. 5b
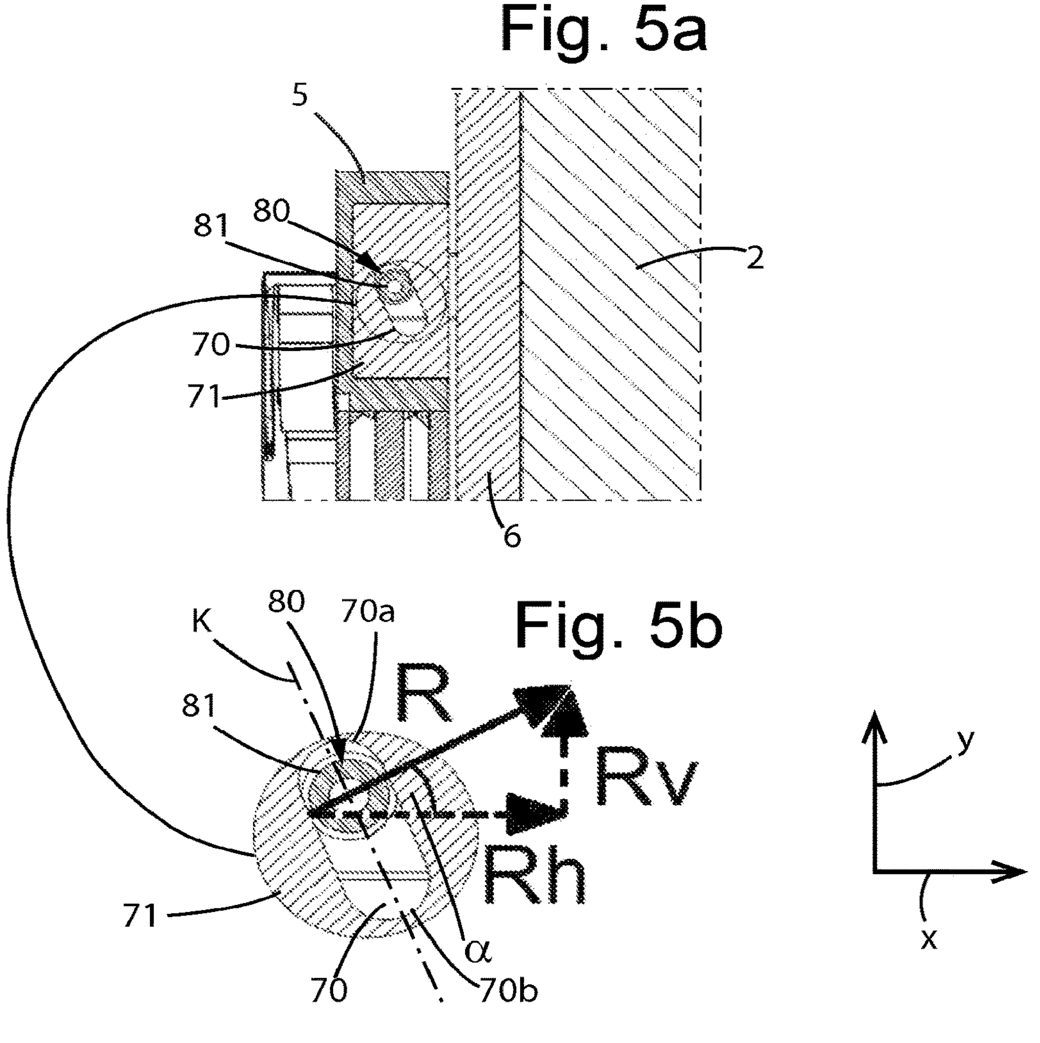

Fig. 8b
Fig. 8a
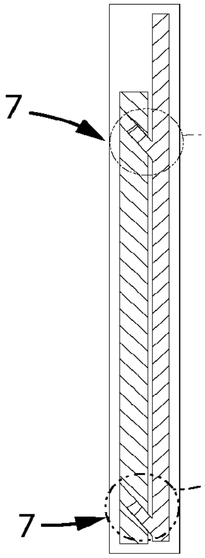
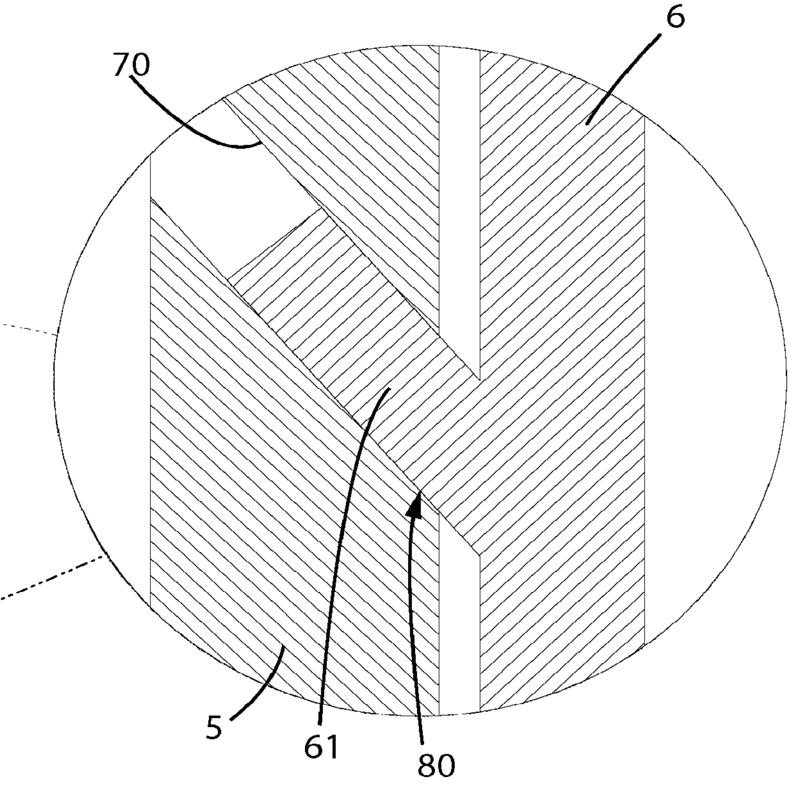
Fig. 9b
Fig. 9a
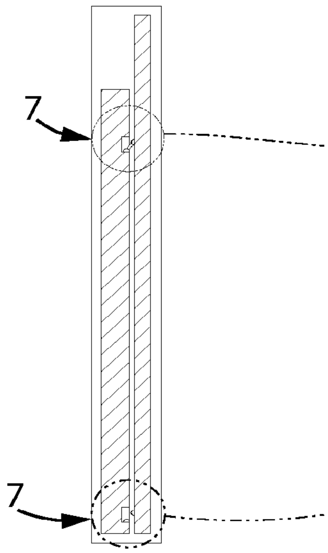
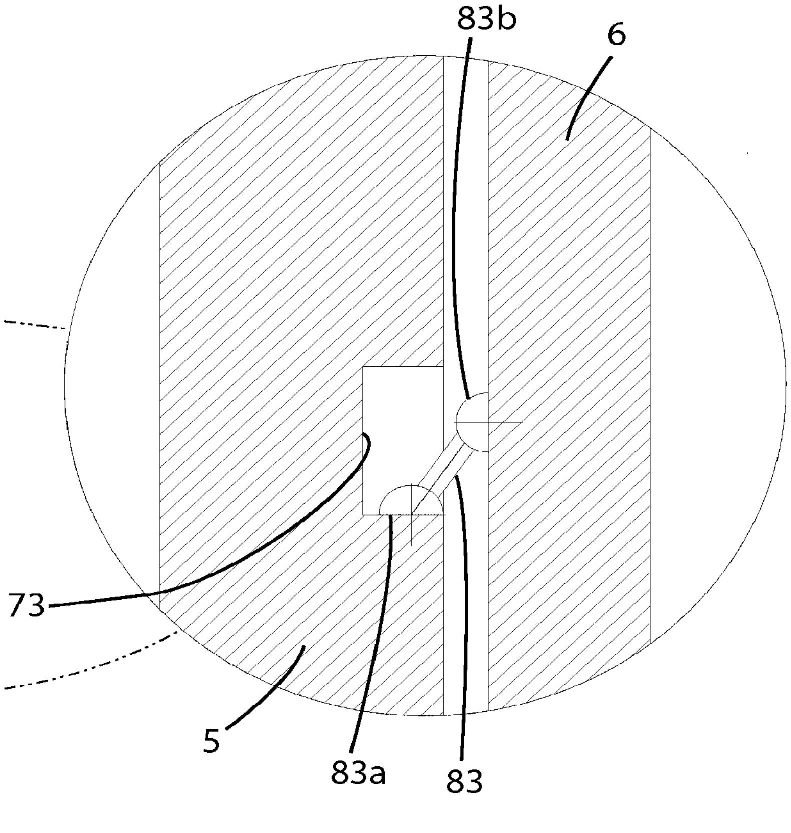

CLAMPING EQUIPMENT FOR LIFTING LOADS AND FORKLIFT TRUCK COMPRISING SUCH EQUIPMENT

The present invention relates to a clamping equipment for lifting a load, such as one or more household appliances.

The present invention finds useful use in the context of forklift trucks, for lifting and moving different types of the loads, in particular household appliances. Nowadays, various types of forklift trucks are known for handling loads such as packed goods, reels or other objects.

It should be noted that a known forklift truck generally comprises an upright, to which a vertically movable carrier plate is slidingly connected, and to which a special equipment is fixed to grip the load to be handled, e.g. clamps, forks, or pushpull type pushers. In particular, for handling household appliances, it is known to equip the moving carrier plate with clamps. Known clamping equipment generally comprises a fixed frame, mounted on such a carrier plate, and a pair of jaws, slidingly coupled to the frame and actuated by linear actuators.

These jaws comprise, in particular, panels designed to be moved by means of a drive system, in approach to each other until they come into contact with the load, and then tighten it with a sufficient tightening force to be able to lift it. These panels generally have an inner surface coated with rubber with a high coefficient of friction, so as to ensure that the grip with the load is tight when it is lifted.

In order not to damage the household appliance, it is also known to adjust the tightening force according to the load to be handled, in order to tighten the jaws with a higher force in the case of heavier loads and with a lower force in the case of lighter loads.

In order to adjust the tightening force, systems are known, for example, which envisage installing a valve in the clamping equipment described above, which can be manually adjusted by means of a lever that can assume a plurality of working positions, each corresponding to a tightening pressure value that in turn corresponds to a respective tightening force. Using this lever, an operator can thus tighten or loosen the jaws depending on the weight of the load to be lifted.

As an alternative to the lever, it is known to employ computer-based user interfaces, e.g. viewable on a display.

Disadvantageously, in clamping equipment in which the lever is present, the tightening pressure is adjusted not in a precise manner, being selected by an operator manually, as well as in the systems with a computer interface.

Disadvantageously, the installation of the additional valve to the clamping equipment requires hydraulic and/or electrical modifications to the existing drive system.

Tightening force adjustment systems comprising sensors, such as photocells or ultrasounds, mounted on the clamping equipment are also known. These sensors in particular are adapted to detect the dimensions of a load, i.e. height, length and width, placed between the jaws or the position of the tightening jaws. The detected information about the dimensions of the load is transferred to a control unit, connected to the drive system, which sets the tightening pressure accordingly, i.e. based on the dimensions of the load. In fact, the different combinations and/or types of load are loaded a priori into a memory unit that is also connected to the drive system, so that each dimension is associated with a relative tightening pressure. The tightening pressure is, also in this case, obtained from a solenoid valve installed on the clamping equipment and connected to the drive system.

Disadvantageously, such tightening force adjustment systems do not allow to distinguish loads with the same dimensions but with different weights.

These types of systems also require the installation of a proportional solenoid valve to set the various pressures, as well as being pre-programmed so that a corresponding pressure value is associated with each load shape/dimension. In addition, such systems are more complex and involve higher costs than the systems provided with lever/computer interface.

Other types of adjustment systems are also known, which envisages carrying out an initial lifting of the load in order to determine the weight of the load itself, e.g. by means of the load cells, or by measuring the pressure required for lifting. In particular, a predefined initial tightening pressure, capable of lifting even the heaviest loads, is applied to lift the load. Once the weight of the load has been established, the tightening pressure appropriate for lifting the load is determined and set.

Disadvantageously, in the systems where an initial lift is envisaged, it is necessary to tighten the load for a predetermined time by applying to it the maximum tightening pressure, even in the case of lighter loads, and this is precisely the condition that is to be avoided because it could damage the load.

Moreover, even in the case of such systems, one must consider the increased costs and complexity resulting from the additional electronic and hydraulic systems required, and the modifications to the clamping equipment that these entails.

Aim of the present invention is to overcome the above-mentioned drawbacks and in particular to devise a clamping equipment for lifting a load that allows the tightening force to be adjusted accurately and easily based on the weight of the load to be lifted, in order to avoid damages to the load itself due to an over-tightening of the jaws.

This and other aims according to the present invention are achieved by realizing a clamping equipment for lifting a load as set out in independent claim 1.

Further characteristics of the clamping equipment for lifting a load are the subject-matter of dependent claims.

The features and advantages of the system of clamps for handling loads according to the present invention will become clearer from the following description, which is to be understood as exemplifying and not limiting, with reference to the appended schematic drawings, wherein.

Figure 3A:
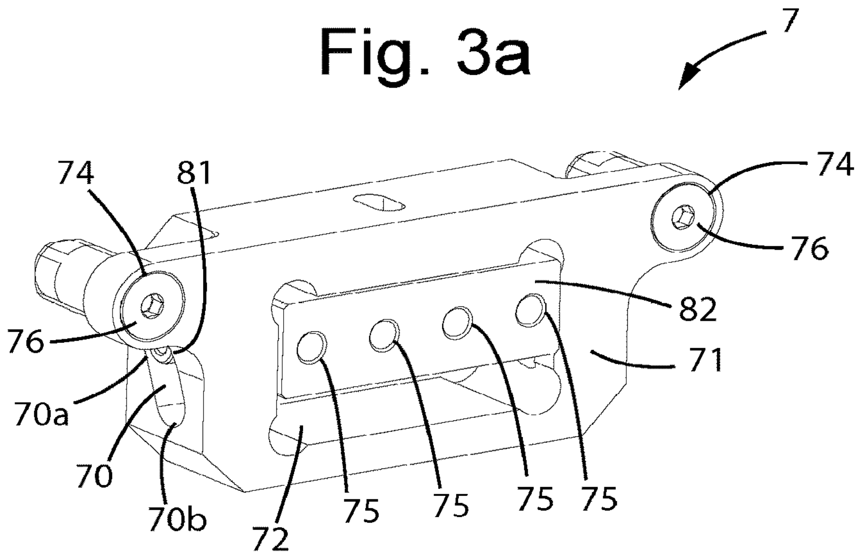
Figure 3B:
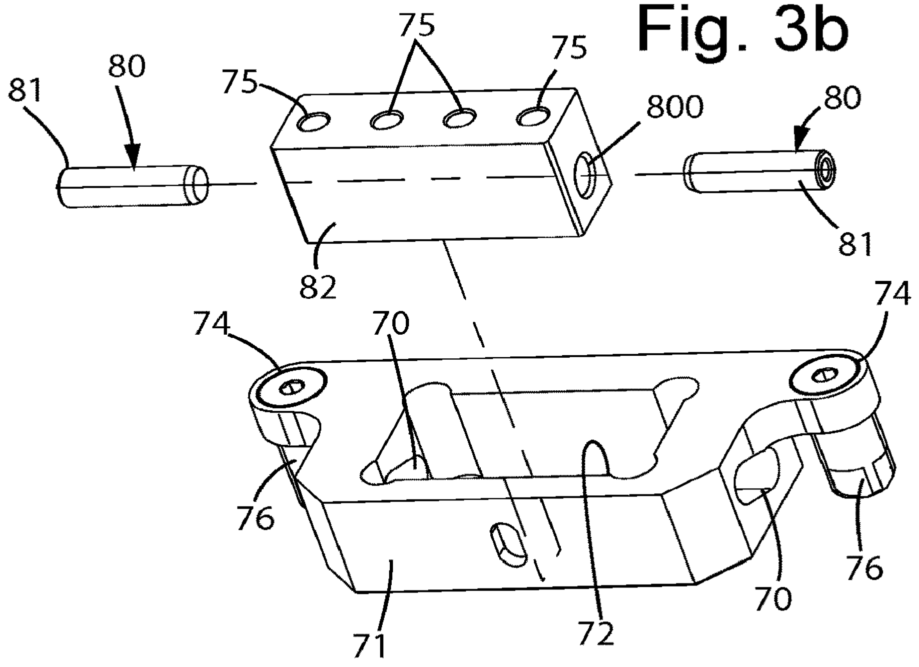
Figure 3C:
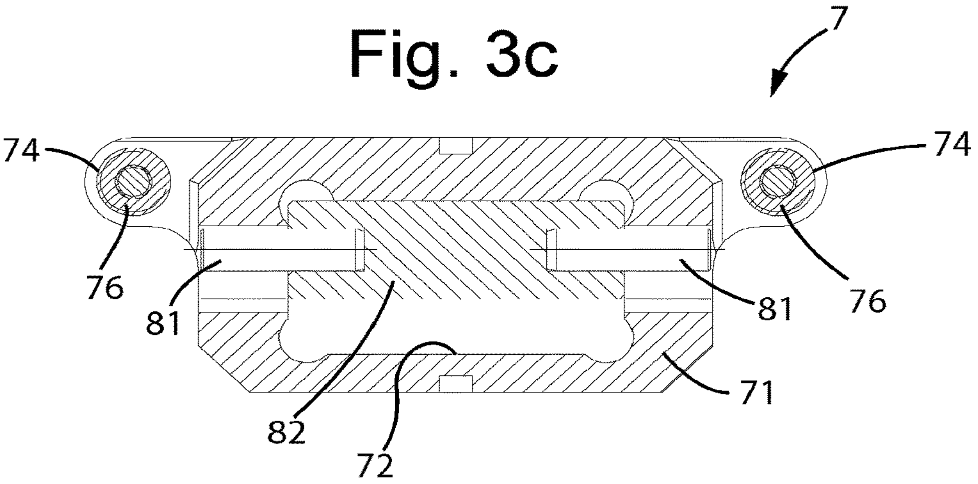
Figure 6B:
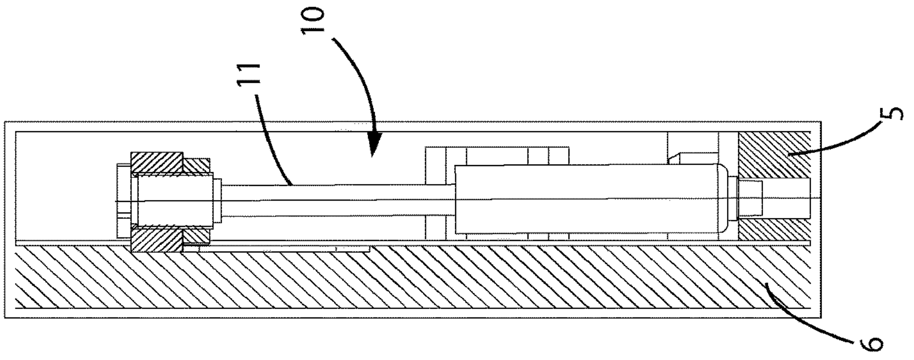
Figure 6A:
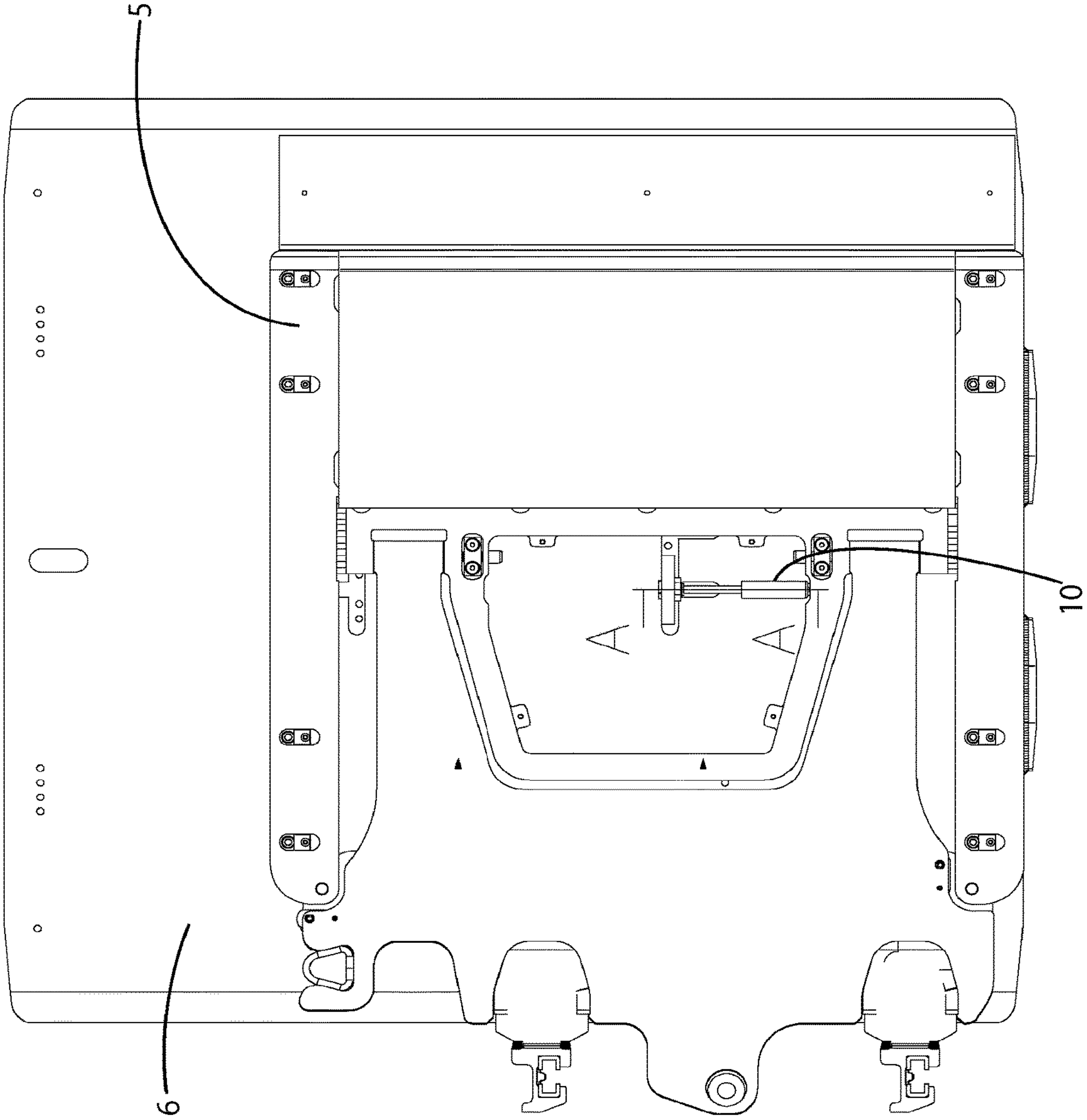
Figure 7:
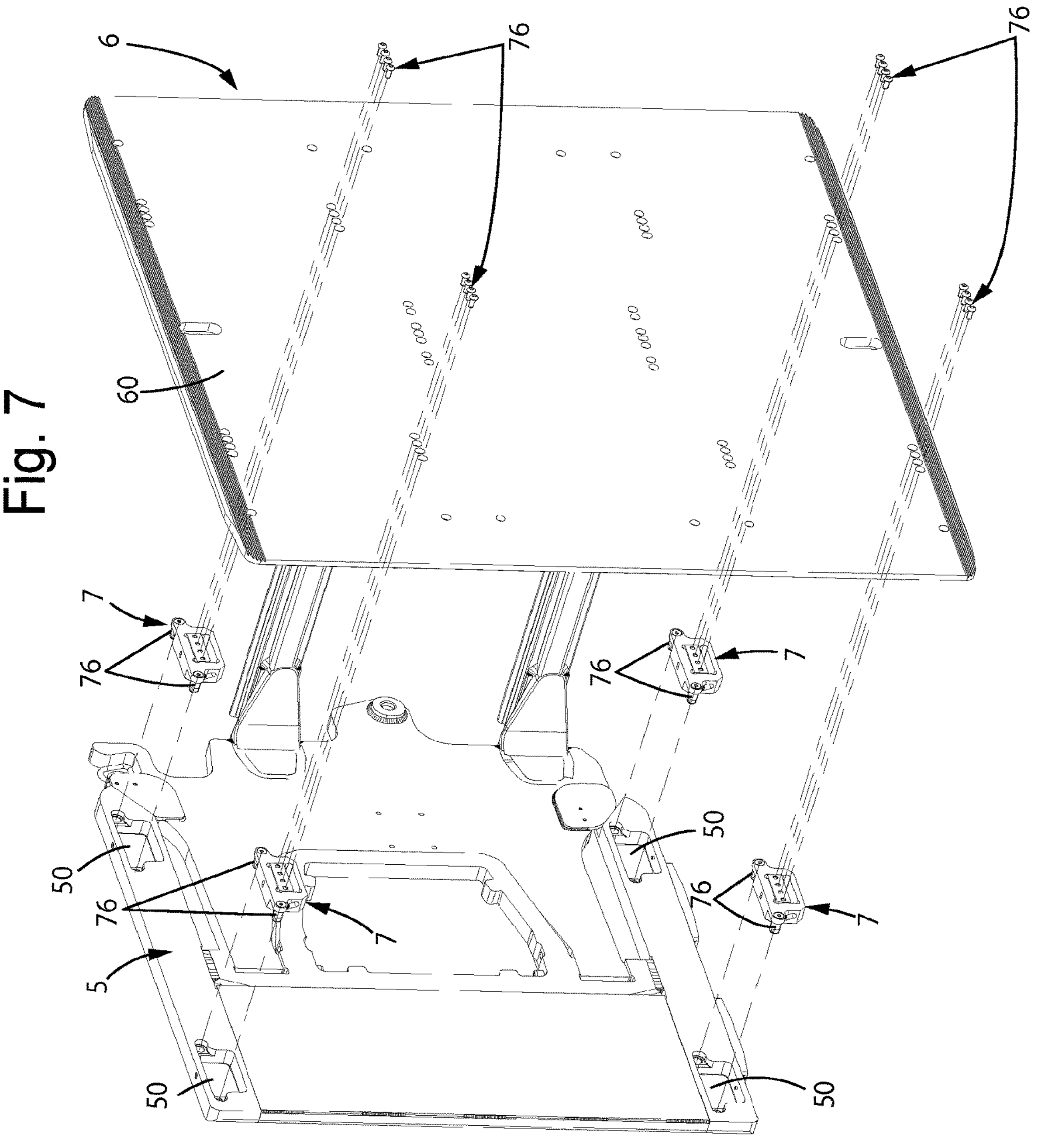
Figure 10:
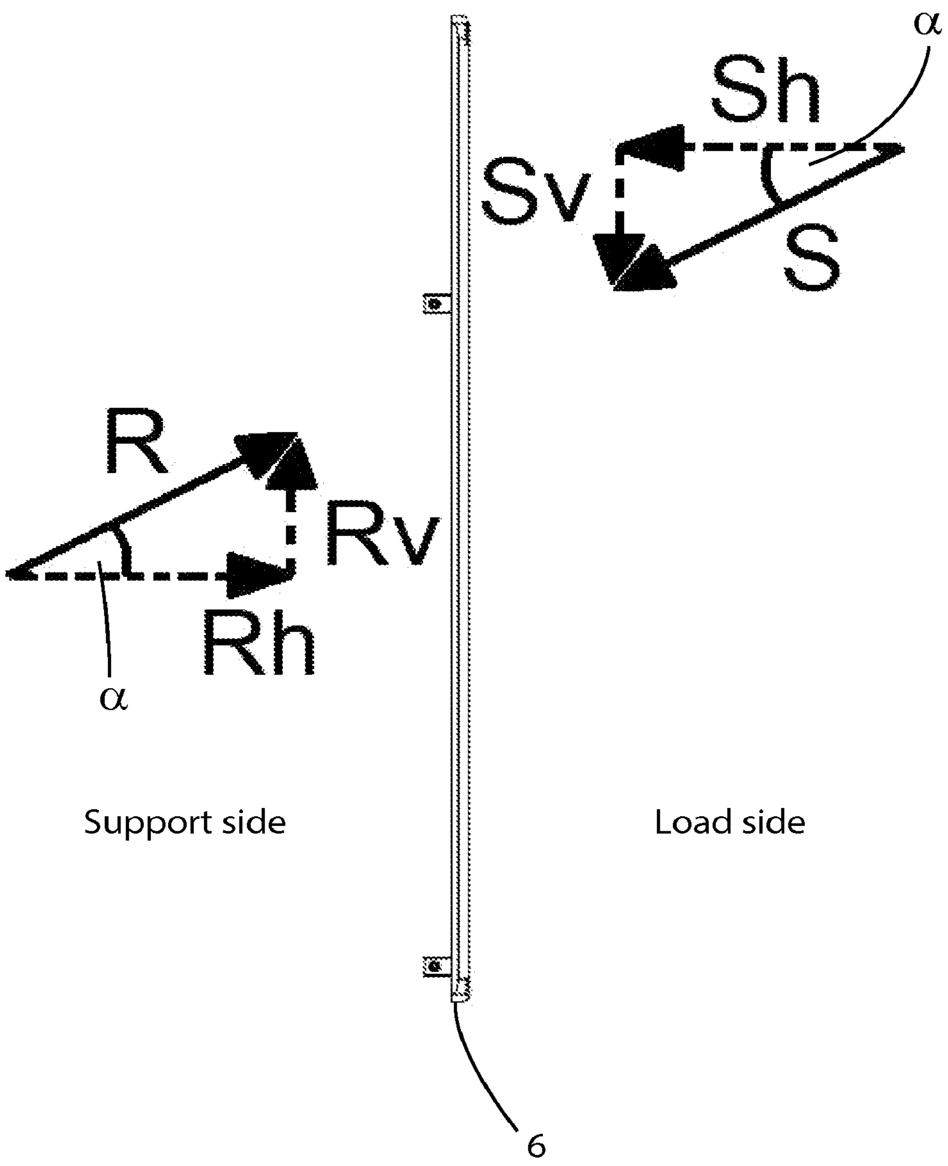
Figure 11:
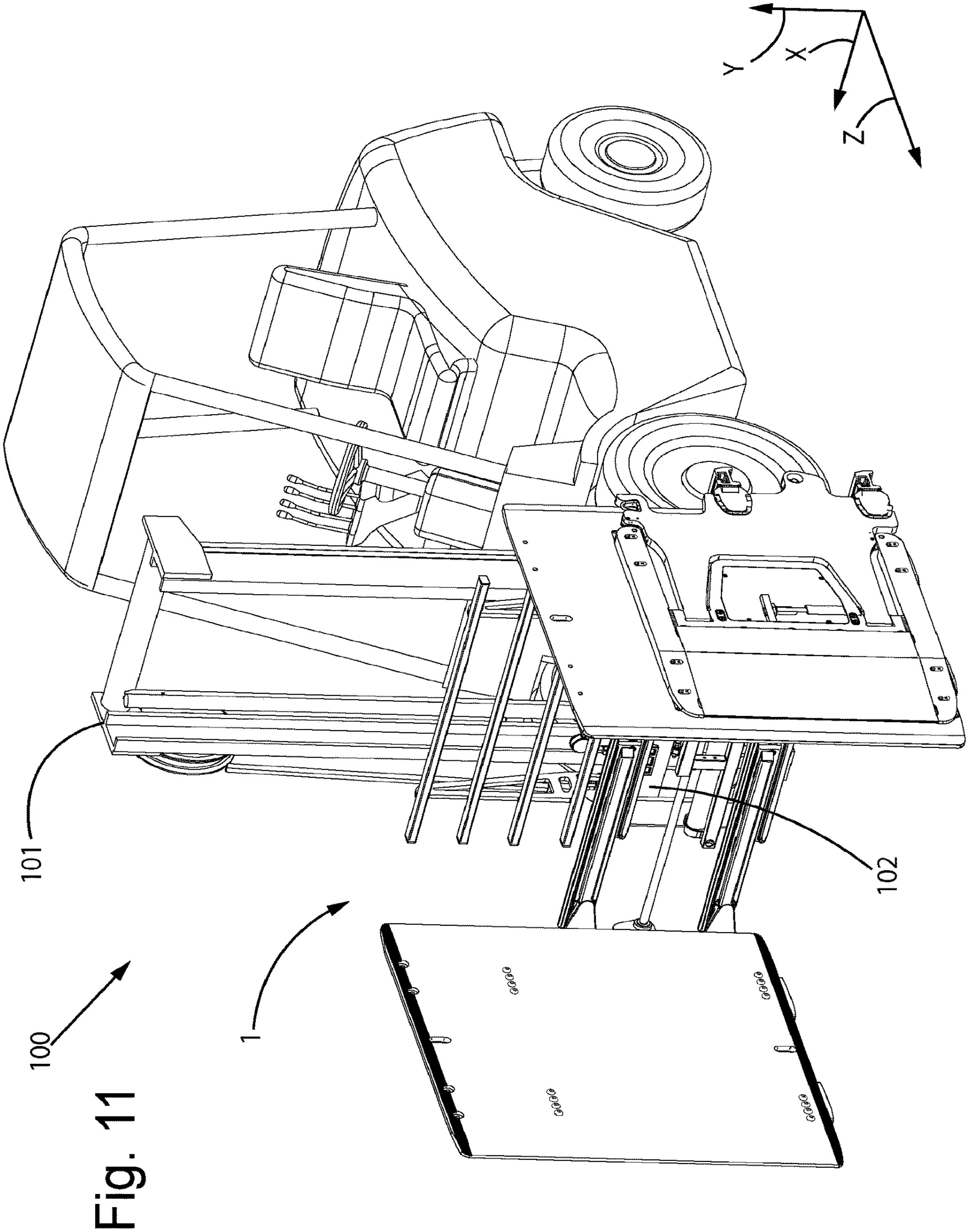

FIGS. 3*a*, 3*b* and 3*c* show respectively a perspective view, an exploded view and a sectional view of an isolated detail of a clamping equipment according to the present invention in a first embodiment;

FIGS. 4, 5*a* and 5*b* show side views, in section, of some details of FIGS. 3*a*-3*c* inserted in the clamping equipment;

FIGS. 6*a* and 6*b* show, respectively, a frontal and sectioned view of further details of a clamping equipment according to the present invention;

FIG. 7 shows an exploded view of some details of a clamping equipment in the first embodiment thereof;

FIGS. 8*a* and 8*b* show side views of a detail of the clamping equipment according to the present invention in a second embodiment;

FIGS. 9*a* and 9*b* show side views of a detail of the clamping equipment according to the present invention in a third embodiment;

FIG. 10 shows a diagram of forces at play in the clamping equipment according to the present invention;

FIG. 11 shows a clamping equipment mounted on a forklift truck according to the present invention.

Figure 1:
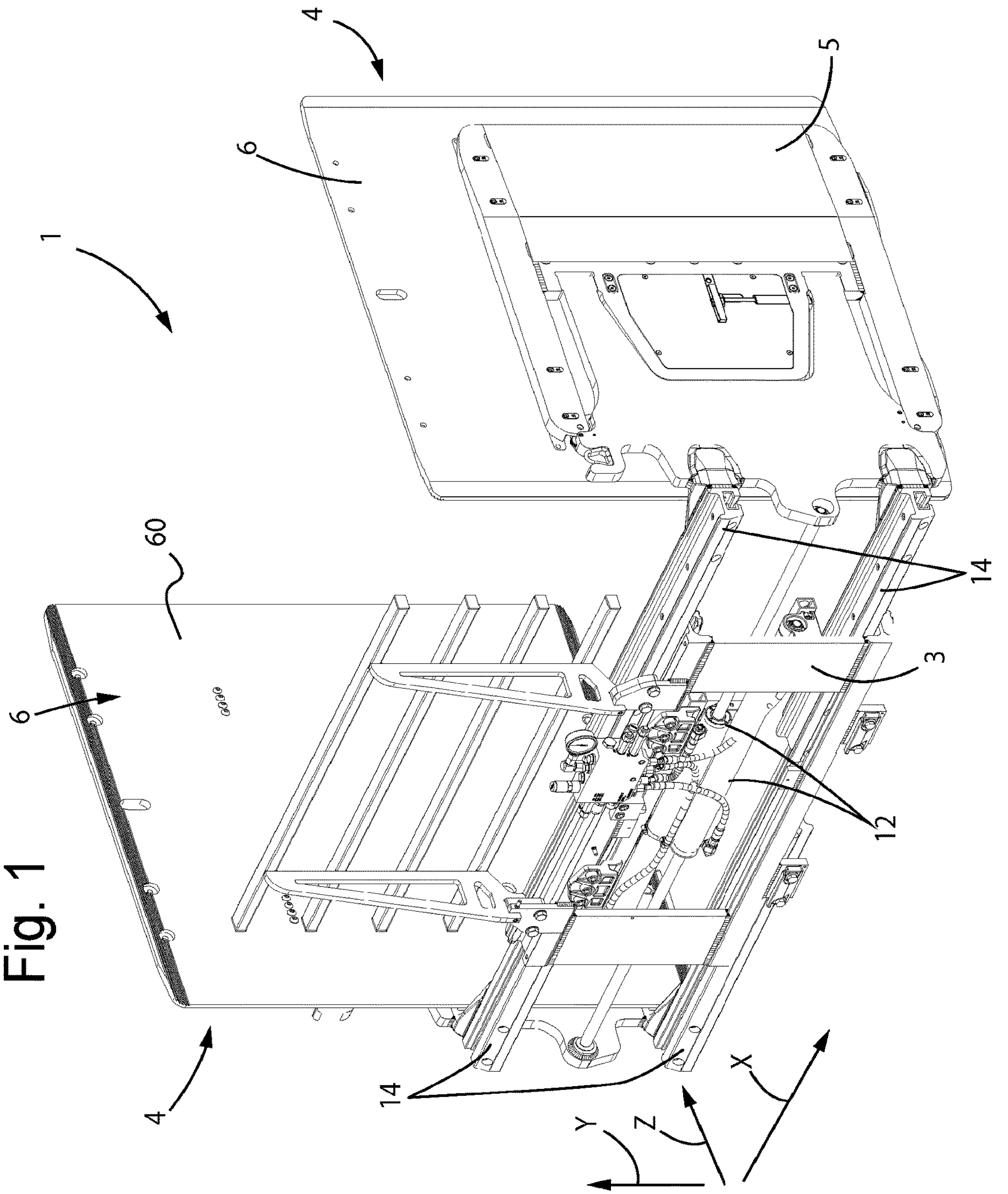
FIG. 1 shows a perspective view of a clamping equipment according to the present invention.
Figure 2:
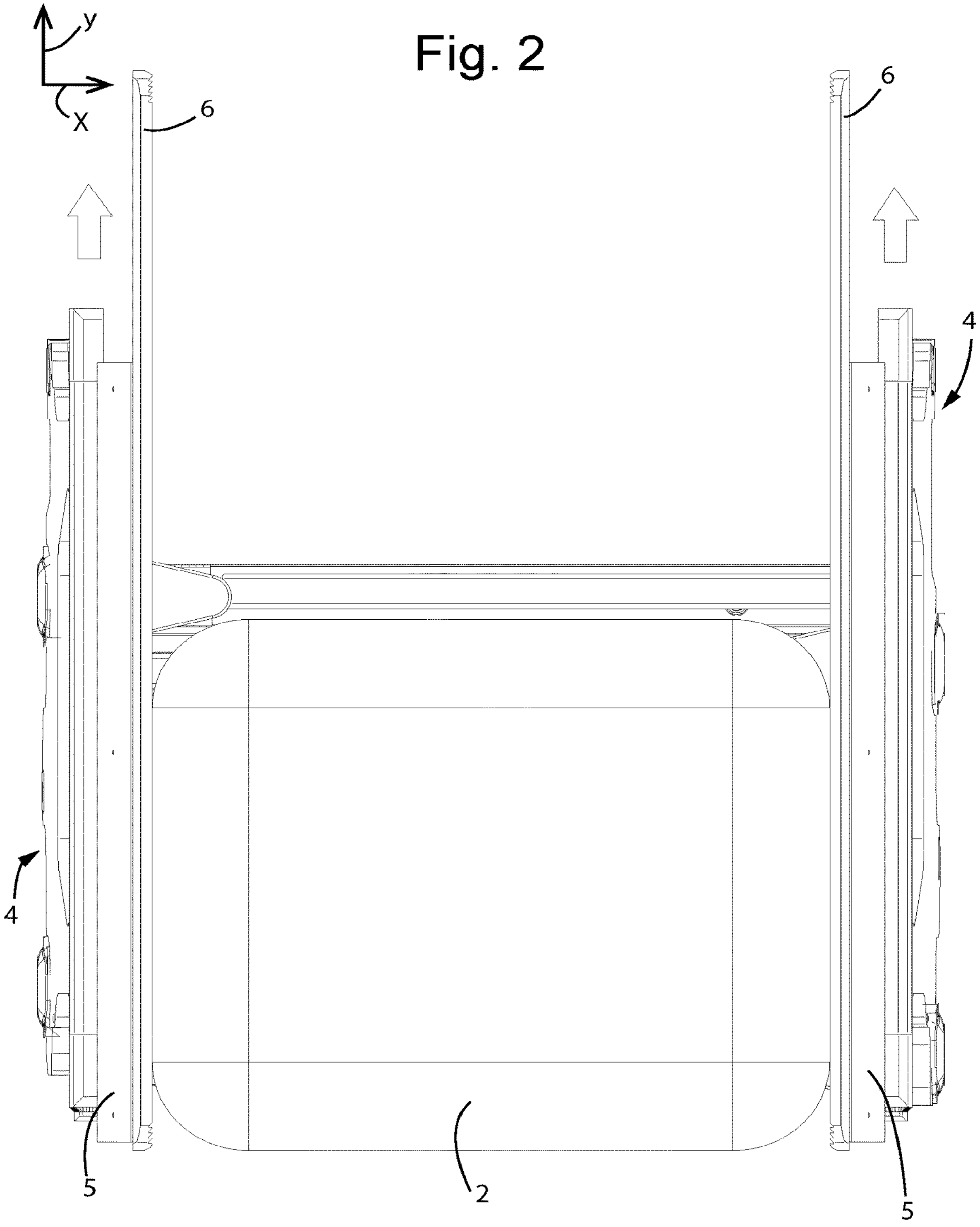
FIG. 2 shows a frontal view of a clamping equipment according to the present invention in operation.

With reference to FIGS. 1 and 2, a clamping equipment 1 for lifting a load 2 is described. This clamping equipment 1 is arranged to be coupled to a forklift truck 100, as visible in FIG. 10.

A forklift truck 100 therefore also forms part of the present invention, comprising an upright 101 extending along a vertical direction Y, a carrier plate 102 slidingly coupled to the upright 101 and the clamping equipment 1 according to the present invention, fixed to the carrier plate 102.

The clamping equipment 1 comprises a fixed frame 3 extending along a longitudinal direction X and which is apt to be coupled to a carrier plate 102 of a forklift truck 100.

The clamping equipment 1 also comprises two jaws 4, opposite each other and slidingly connected to the fixed frame 3 along the longitudinal direction X to be tightened in grip on a load 2.

Note that each jaw 4 comprises a support 5, connected to the fixed frame 3. This connection is achieved by means of guide profiles 14 and shoes (not shown) inserted in these profiles 14.

The support 5 is configured to be moved in an integral manner with the fixed frame 3 in a vertical direction Y. In particular, the support 5 is moved upwards to lift the load 2.

It should be noted that in the remainder of this description, the terms "high", "low", "upper" and "lower", as well as "vertical" and "horizontal", are to be understood once the clamping equipment 1 has been installed.

Each support 5 is also configured to be slidingly movable relative to the fixed frame 3 in the longitudinal direction X. In other words, the support 5 is rigidly connected to the fixed frame 3 along the vertical direction Y, as the fixed frame 3 is coupled to the carrier plate 102 which is movable along the vertical direction Y. The support 5 is also movable relative to the fixed frame 3 along the longitudinal direction X. Each jaw 4 further comprises a panel 6 coupled to the support 5 and having a surface 60 configured to come into contact with a load 2 to be handled. In particular, this surface 60 has a coefficient of friction, so that a certain static friction p is achieved with the load 2, more details of which will be given later in this description.

The clamping equipment 1 also comprises actuators 12 connected to the jaws 4 and configured to move the supports 5 and the relative panels 6 along the longitudinal direction X with respect to the fixed frame 3, in approach to a load 2.

The jaws 4 substantially extend in a plane that is perpendicular to the longitudinal direction X. A transverse direction Z belongs to this plane, which is thus orthogonal to the longitudinal direction X.

It should be therefore noted that the longitudinal direction X is a first horizontal direction. The vertical direction Y is the direction along which the upright 101 of the forklift truck 100 extends, i.e. along which the carrier plate 102 to which the clamping equipment 1 is fixed, perpendicular to the longitudinal direction X, slides. The transverse direction Z, which represents a direction belonging to the plane of the jaws 4, arranged perpendicularly to the fixed frame 3, is a second horizontal direction, orthogonal to the vertical direction Y and to the longitudinal direction X.

With reference to FIGS. 3*a*-3*c*, 8*a*-8*b* and 9*a*-9*b*, in accordance with the present invention, each jaw 4 comprises at least one coupling assembly 7 associated with the support 5 and with the panel 6 and configured to movably couple the panel 6 to the support 5. The coupling assembly 7 is interposed between the panel 6 and the support 5.

In particular, the coupling assembly 7 is configured to make the panel 6 and the support 5 movable between them with a motion component in a direction orthogonal to the panel 6 and a motion component in vertical direction Y. In particular, thanks to the coupling assembly 7, the panel 6 moves approaching the panel 6 of the opposite jaw 4 and along the vertical direction Y downwards, from a first configuration in which it is approached to the support 5 at a second configuration in which it is spaced and lowered with respect to the support 5, when the support 5 is lifted in the vertical direction Y and when the jaws 4 are tightened in grip on the load 2.

According to embodiments of the present invention, the coupling assembly 7 of each jaw 4 comprises a guide 70 and a slider 80 slidingly coupled to the guide 70.

For example, the guide 70 is associated with the support while the slider 80 is associated with the panel 6. Alternatively, the guide 70 can be associated with the panel 6 while the slider 80 can be associated with the support 5.

It should be noted that the guide 70 extends along an extension direction K which is inclined with respect to the longitudinal direction X.

The slider 80 is configured to move with respect to the guide 70, along such an extension direction K, giving rise to a reciprocal movement between the panel 6 and the support 5.

In particular, the conformation of the guide 70 inclined with respect to the longitudinal direction X, and therefore also with respect to the vertical direction Y, gives rise to the horizontal motion component and to the vertical motion component of the panel 6 with respect to the support 5, as shown in FIGS. 4-5*b*.

Note also that the extension direction K is directed towards the panel 6 of the opposite jaw 4. In particular, the extension direction K is oriented from above towards the support 5 and from below towards the panel 6. Accordingly, the guide 70 has an upper end-of-stroke 70*a* that is turned towards the support 5 and a lower end-of-stroke 70*b* that is turned towards the panel 6.

In particular, the slider 80 is located at the upper end-of-stroke 70*a* at a step prior to lifting, as shown in FIGS. 5*a* and 5*b*. The slider 80, on the other hand, is located in intermediate positions of the guide 70, as shown in FIG. 4, until reaching the lower end-of-stroke 70*b*, if necessary, when the lifting of the support 5 is in progress.

In this sense, precisely the orientation of the guide 70 results in a movement of the panel 6 away from the support 5 of the same jaw 4 and an approach of the opposite jaw 4 to the panel 6 as the slider 80 moves from its initial upper end-of-stroke position 70*a*.

When the support 5 is lifted, the panel 6 then moves approaching the load 2, exerting a pressure on it. More details regarding the operation of the clamping equipment 1 are provided in a later part of this description.

Since the guide 70 is oriented downwards, in order to maintain the panel 6 in the first configuration in a phase prior to lifting, i.e. in the initial upper end-of-stroke position 70*a*, the clamping equipment 1 preferably comprises a pushing element 10. The pushing element 10 is configured to exert an upward push on the panel 6. In particular, this push is greater than the weight of the panel 6. In fact, it should be noted that, otherwise, the panel would tend by gravity to position itself in the lower end-of-stroke 70*b* position.

With reference to FIGS. 6*a* and 6*b*, the pushing element 10 is interposed between the support 5 and the panel 6. This pushing element 10, for example, comprises a gas spring 11, connected to the panel 6 and to the support 5 to exert the push on the panel 6. Alternatively, a different type of spring can also be used.

The pushing element 10 can alternatively be configured with a different type of springs, e.g. helical or disc springs.

Note that according to the present invention, the extension direction K forms with the vertical direction Y an angle $\alpha$ between 10° and 35°. Preferably, said angle $\alpha$ is between 15° and 30°. Still preferably, the angle $\alpha$ is between 20° and 25°. More details about the angle $\alpha$ are given below.

Still preferably, the guide 70 is defined by a slot while the slider 80 is defined by a pin 81.

In other words, the guide 70 is configured as a through hole, e.g. an elongated hole extending along the extension direction K, in which the pin 81 is inserted. In accordance with an initial embodiment, the guide 70 is fixed to the support 5, while the slider 80 is fixed to the panel 6. That is, the guide 70 and the slider 80 are elements separated from the support 5 and from the panel 6 but connected to them.

According to a second embodiment, however, the guide 70 is formed on the support 5, i.e. it is part of the support 5 itself, while the slider 80 is formed on the panel 6, i.e. it is part of the panel 6 itself.

According to the first embodiment, the coupling assembly 7 comprises a first block 71 on which the guide 70 is obtained.

In addition, the coupling assembly 7 comprises a second block 82 which is coupled to the slider 80.

The first block 71 and the second block 82 are in particular shown in FIGS. 3*a*-3*c*.

The slider 80 is preferably rigidly connected to the second block 82. Alternatively, the slider 80 can be part of the second block 82.

In any case, the movement of the second block 82 is due to the movement of the slider 80 with respect to the guide 70, as better illustrated below.

It should therefore be noted that the first block 71 is rigidly jointed with the support 5, while the second block 82 is rigidly jointed with the panel 6.

In accordance with this embodiment, the first block 71 comprises a seat 72 designed to accommodate the second block 82 and to allow translation of the second block 82 with respect to the first block 71 to switch the panel 6 between the first and the second configuration. In particular, the seat 72 is an opening preferably located in a central portion of said first block 71. Preferably this opening is a through opening and is located at the central faces of the first block 71.

The second block 82 is located inside the seat 72. Preferably, the first block 71 comprises at least one guide 70 and the second block 82 comprises at least one slider 80.

Still preferably, each first block 71 comprises two guides 70 and each second block 82 comprises two sliders 80, i.e., two pins 81.

The guides 70 are preferably placed laterally with respect to the seat 72.

In turn, the second block 82 is configured to accommodate the sliders 80 at two side faces. Preferably, the second block 82 has two blind holes 800, each apt to accommodate a respective pin 81 with forced coupling. The pins 81 are inserted inside the guides 70 with free coupling and are therefore rigidly jointed with the second block 82. The second block 82 is therefore free to slide inside the first block 71 along the extension direction K of the guide 70.

Preferably, according to the first embodiment, the first block 71 is fixed to the support 5 and the second block 82 is fixed to the panel 6.

In particular, the first block 71 has two or more through holes 74 to allow coupling with the support 5. The through holes 74 are, for example, located at perimeter positions of the first block 71.

Each support 5 also preferably has a housing portion 50 configured to insert therein the first block 71 suitably sized, as shown in FIG. 7.

Still preferably, also the second block 82 has two or more threaded holes 75 to allow coupling with the panel 6, preferably at the front faces.

The panel 6 and the support 5 are screwed with threaded screws 76 respectively to the second block 82 and to the first block 71, through the threaded holes 75 and the through holes 74, also preferably threaded.

According to a preferred embodiment, each jaw 4 comprises four coupling assemblies 7, i.e. four first blocks 71 and four second blocks 82 each inserted into a corresponding first block 71. In particular, the coupling assemblies 7 are arranged two by two opposite each other.

Accordingly, preferably, each support 5 has four accommodating portions 50.

This allows the first and second blocks 71, 82 to be removed if necessary or arranged independently of each other.

In fact, preferably, the threaded screws 76 of connection between the first blocks 71 and the support 5 are of the adjustable type, so that their position along the longitudinal direction X can be varied independently of each other. In this way, the clamping equipment 1 is adaptable to the shape of the load 2, being able to adapt the geometry of the panel 6 to that of the load 2.

It is advantageously possible to further improve the grip of the load 2 by means of the clamping equipment 1 described.

According to the second embodiment, both the guide 70 and the slider 80 are directly part of the support 5 itself or of the panel 6 itself, respectively, or vice versa. Preferably, as shown in FIGS. 8*a* and 8*b*, the guide 70 is obtained in the support 5. On the other hand, the panel 6 has a projecting portion 61 that extends along the extension direction K of the guide 70 so that it can be inserted into the guide 70. In accordance with this embodiment, the slider 80 is therefore defined by the projecting portion 61 of the panel 6.

According to a third embodiment, the first coupling element 7 comprises a lever 83 at one end 83*a* hinged to the support 5 and at the opposite end 83*b* hinged to the panel 6.

In this embodiment, the panel 6 and the support 5 are configured to move with respect to each other by rotation of the lever 83 with respect to the support 5 and to the panel 6. In this way, a lifting of the support 5 along the vertical direction Y corresponds to a downward rotation of the panel 6, and thus a horizontal motion component in approach towards the panel 6 of the opposite jaw 4 and a downward vertical motion component. According to this embodiment, preferably the lever 83 is arranged so that it protrudes upwards in the direction of the panel 6.

Preferably, in this third embodiment, the support 5 has a recessed portion 73 configured to accommodate the lever 83.

An example of such an embodiment is shown in FIGS. 9*a* and 9*b*.

The principle of operation of clamping equipment 1 is described below. In particular, reference is made below specifically to the first embodiment of the present invention, described above, but the principle of operation illustrated below is also applicable to the second and third embodiments, as well as to further embodiments not included in this description but falling within the scope of protection defined by the accompanying claims.

In fact, embodiments are included in the present invention in which the panel 6 is constrained to the support 5 in such a way as to have both a horizontal motion component, i.e. of exit with respect to the support 5 itself, i.e. away from the support 5 itself, and a vertical motion component with respect to the support 5.

The operation is as follows: a load 2 is tightened between the jaws 4 as described above, applying a limited preload tightening force, which is only necessary to achieve an adhesion between the panels 6 and the load 2. In particular, depending on the coefficient of static friction between the panel 6 and the load 2, it is possible to choose the angle α so that the adhesion condition is met by applying a limited tightening force. Next, the jaws 4 are lifted, in particular by sliding upwards along the vertical direction Y by the carrier plate 102 connected to the upright 101 of the forklift truck 100.

In an initial lifting phase, it occurs that the load 2 remains on the ground, with the panels 6 stationary due to the lifting of the supports 5 and consequently of the movement of the first blocks 71. There is therefore a relative motion of the second blocks 82 relative to the first blocks 71, which causes relative sliding between the guides 70 and the pins 81.

Subsequently, due to the inclination of the extension direction K of the guides 70, there is a progressive exit of the second blocks 82 and of the panels 6 from the plane of the supports 5, i.e. an offset from the transverse direction Z. With the progressive lifting of the supports 5, and the relative sliding of the slider 80 with respect to the guide 70, it therefore appears that the panels 6 progressively compress the load 2, increasing the tightening force applied against the load 2.

From the point of view of the forces at play, it is assumed in the following that the frictions between the pins 81 and the guides 70 are disregarded. This assumption is reasonable as these components have a particularly low degree of surface roughness.

With reference to FIG. 5*b*, there is therefore a resultant force R applied by each support 5 to the relative panel 6 which is perpendicular to the extension direction K of the guide 70, therefore inclined at an angle with respect to the longitudinal direction X which is the same angle α formed by the extension direction K with the vertical direction Y.

This force can therefore be decomposed into a vertical component Rv and into a horizontal component Rh. Specifically, the horizontal component Rh of the resultant force R corresponds to the tightening force on the load 2 exerted by the panel 6. On the other hand, the vertical component Rv of the resultant force R corresponds to the lifting force of the load 2.

Under this assumption, the vertical component Rv of the resultant force R and the horizontal component Rh of the resultant force R are linked by the relationship:

$$Rv = Rh \cdot \tan\alpha \qquad \text{(a)}$$

Consequently, an increase in the tightening force Rh corresponds to a progressive increase in the vertical component RV, i.e. the lifting force.

When Rv exceeds the value by half the weight of the load 2—half the weight is taken into consideration as there are two jaws 4—, also disregarding the weight of the panels 6, as it is balanced by the push of the pushing elements, the lifting of the load 2 itself takes place. In this final lifting condition, the relationship applies:

$$Rh = \frac{P}{2\tan\alpha} \qquad \text{(b)}$$

This relationship is in particular obtained by replacing the relationship a) P/2 to Rv, where P is the weight of the load 2.

In particular, the tightening force Rh is proportional to the weight of the load 2.

By appropriately choosing the value of the angle α, as shown below, it is possible to optimize the link between the lifted weight Rv and the corresponding tightening force Rh.

Therefore, the clamping equipment 1 described above allows an automatic adaptation of the tightening force Rh to the weight of the load 2.

Advantageously, the adaptation of the tightening force Rh is automatic and is only due to the mechanics of the components; there is therefore no need for electronic or hydraulic components to be introduced. It is also advantageously possible to keep costs down compared to the existing solutions.

In practice, in case of heavier loads the tightening force Rh, the compression of the load 2 and the sliding of the second blocks 82 within the first blocks 71 will be greater. The sliding of the second block 82 in particular depends not only on the weight of the load 2, but also on the rigidity to compression of the load 2. In particular, for the same weight P of the load 2, if the load 2 has a lower rigidity to compression, there will be a greater sliding of the second blocks 82 inside the first blocks 71 to generate the same final lifting force P/2; in fact, for the same forces at play, if the load 2 is less rigid to compression, there will be a greater crushing of the load 2 and a greater sliding of the blocks 82.

A further advantage is given by the fact that linear actuators 12 can be installed with a reduced force compared to normal applications, as it is only necessary to apply a preload force apt to make contact between the load 2 and the panels 6.

For example, using the described clamping equipment 1, a preload force of 650 kg is sufficient to lift a load 2 of 1600 kg. With known clamping equipment 1, it would be necessary to apply a tightening force of around 1600 kg. This results in a saving of about 60% in tightening force Rh, with clear advantages on the sizing and on the overall encumbrance of the actuators 12.

The jaws 4, once the load 2 has been lifted, are held in position by the friction of the shoes in the guide profiles 14. The increase in the tightening force Rh from the initial preload value to the final value during lifting is in fact not transmitted to the actuators 12, but balanced by the friction of the shoes of the guide profiles 14.

Again assuming that the friction between the pins 81 and the guides 70 is disregarded, and considering that a lifting force Rv is applied to each support 5, being the panels 6 in contact with the load 2, from a) it follows, for balance, the following relationship between the vertical component Rv and the horizontal component Rh:

$$Rh = \frac{Rv}{\tan\alpha} \qquad \text{(c)}$$

Since the support 5 applies to the panel 6 a force R whose horizontal and vertical components are Rh and Rv respectively, for balance, considering isolating the panel 6, it follows that the load 2 exerts on the panel 6 an equal and opposite force S, having in turn horizontal and vertical components Sh and Sv respectively, as shown in FIG. 10.

In particular, the horizontal component Sh generates, by static friction, the vertical component Sv, which opposes to the vertical lifting of the panel 6. Given the static friction coefficient μ between the panel 6 and the load 2, the maximum possible value of Sv is:

$$Sv_{max}=Sh\cdot\mu \quad (d)$$

Furthermore, for horizontal balance and for c), we have:

$$Sh = Rh = \frac{Rv}{\tan\alpha} \quad (e)$$

Accordingly, by replacing e) in d), we have:

$$Sv_{max} = \frac{RV}{\tan\alpha}\cdot\mu \quad (f)$$

From the analysis of the vertical forces acting on the panel 6 it follows that the force Rv tends to lift the panel 6, while the horizontal force Sv of the load 2 opposes to lifting. In particular, in order to have the adhesion condition between the load 2 and the panel 6, the latter must not be lifted. It follows that the maximum friction force $Sv_{max}$ must be greater than Rv. Inequality must therefore apply:

$$Sv_{max}\geq Rv \quad (g)$$

By replacing f) in g), we have:

$$\frac{Rv}{\tan\alpha}\cdot\mu \geq Rv \quad (h)$$

That is, simplifying:

$$\tan\alpha\leq\mu \quad (i)$$

Therefore, in order to have adhesion between the panel 6 and the load 2, the condition i) between angle α and coefficient of static friction μ must be met.

In practical applications, cautiously considering 0.8 as the reference value of μ, α<38° is obtained.

As already observed, however, it is possible to appropriately realize the coupling assembly 7 by choosing α in such a way as to optimize the link between the weight lifted and the corresponding tightening force Rh, while still respecting i).

From the above description the characteristics of the clamping equipment object of the present invention are clear, as are the relative advantages.

Finally, it is clear that the clamping equipment thus conceived is susceptible of numerous modifications and variations, all of which are within the scope of the invention; moreover, all the details can be replaced by technically equivalent elements. In practice, the materials used, as well as their dimensions, can be of any type according to the technical requirements.

The invention claimed is:

1. A clamping equipment for lifting a load arranged to be coupled to a forklift truck, said clamping equipment comprising:

a fixed frame extending in a longitudinal direction and configured to be coupled to a carrier plate of a forklift truck;

two jaws opposite each other and slidingly connected to said fixed frame along said longitudinal direction to be tightened in grip on a load;

each jaw comprising:

a support connected to said fixed frame and configured to be moved in an integral manner with said fixed frame in a vertical direction and in a sliding manner relative to said fixed frame in said longitudinal direction; said support having a housing portion;

a panel coupled to said support and having a surface configured to come into contact with a load to be handled;

at least one coupling assembly associated with the support and the panel; said coupling assembly being configured to movably couple said panel to said support with a motion component in a direction orthogonal to said panel and a motion component in vertical direction, said panel moving approaching the panel of the opposite jaw and along the vertical direction downwards from a first configuration in which it is approached to the support to a second configuration in which it is spaced and lowered with respect to the support when said support is lifted in the vertical direction and when said jaws are tightened in grip on the load, wherein said at least one coupling assembly of each jaw includes a nested configuration with a first block inserted in said housing and a second block connected to said panel and accommodated in a seat of the first block to allow translation of said second block with respect to said first block;

wherein said first block defines a guide extending along an extension direction which is inclined with respect to said longitudinal direction and which extends towards the panel of the opposite jaw, wherein said second block is slidingly coupled to said guide by means of a slider to switch said panel between the first and the second configuration with said translation of said second block with respect to said first block.

2. The clamping equipment according to claim 1, wherein said seat of the first block is an opening located in a central portion of said first block.

3. The clamping equipment according to claim 1, wherein said guide is defined by a slot and said slider is defined by a pin.

4. The clamping equipment according to claim 3, wherein said guide is placed laterally with respect to the seat of the first block and the second block is accommodates the slider at a side face.

5. The clamping equipment according to claim 1, wherein said first block and said second block have respectively two or more through holes and two or more threaded holes to enable coupling respectively with said support and said panel.

6. The clamping equipment according to claim 1, wherein each jaw comprises four coupling assemblies arranged two by two opposite each other.

7. The clamping equipment according to claim 1, wherein said guide is formed in said support; and said slider is defined by a projecting portion of said panel.

8. The clamping equipment according to claim 1, wherein said extension direction forms with said vertical direction an angle (α) between 10° and 35°.

9. The clamping equipment according to claim 1, wherein said coupling assembly comprises a lever at a first end hinged to the support and at the opposite end hinged to the panel.

10. The clamping equipment according to claim 1, comprising a pushing element configured to exert on the panel an upward push greater than the weight of the panel.

11. The clamping equipment according to claim 10, wherein said pushing element comprises a gas spring.

12. A forklift truck comprising:

an upright extending along said vertical direction;

a carrier plate slidingly coupled to the upright;

the clamping equipment according to claim 1, fixed to the carrier plate.

* * * * *